United States Patent
Ronzon

[11] Patent Number: 5,098,063
[45] Date of Patent: Mar. 24, 1992

[54] MOTOR ACTUATOR FOR VALVE

[75] Inventor: Norbert Ronzon, Balve, Fed. Rep. of Germany

[73] Assignee: Knebel & Rottger GmbH, Iserlohn, Fed. Rep. of Germany

[21] Appl. No.: 720,901

[22] Filed: Jun. 25, 1991

[30] Foreign Application Priority Data

Feb. 13, 1991 [DE] Fed. Rep. of Germany ....... 4104318

[51] Int. Cl.⁵ .............................................. F16K 31/05
[52] U.S. Cl. ................................ 137/554; 251/129.11; 137/269
[58] Field of Search ................... 251/129.11, 129.12; 137/554, 269

[56] References Cited
U.S. PATENT DOCUMENTS

| | | | |
|---|---|---|---|
| 2,678,661 | 5/1954 | Roper et al. | 137/554 X |
| 4,156,437 | 5/1979 | Chivens et al. | 137/554 |
| 4,577,661 | 3/1986 | Melrose et al. | 251/129.11 X |

Primary Examiner—Arnold Rosenthal
Attorney, Agent, or Firm—Herbert Dubno; Andrew Wilford

[57] ABSTRACT

A valve has a housing having a nonrotatable polygonal-section stem centered on a valve axis and a spindle coaxial with the stem, projecting axially therefrom, and formed with at least one peripheral tooth. A valve actuator has an electric drive motor having a housing and a drive shaft projecting from the housing along the axis and a sleeve fixed to the drive-motor housing coaxially with the shafts and formed with a seat complementarily engageable with the polygonal-section stem. Thus the sleeve and drive-motor housing are rotationally locked to the stem. A coupling fixed on the drive shaft fits complementarily over the spindle at the tooth thereof to rotationally interconnect the spindle and drive shaft and a rotary potentiometer in the sleeve between the coupling and the drive motor has a rotary part fixed on the drive shaft and a nonrotating part fixed on the motor housing.

8 Claims, 2 Drawing Sheets

: 
MOTOR ACTUATOR FOR VALVE

FIELD OF THE INVENTION

The present invention relates to a motorized actuator for a valve. More particularly this invention concerns an actuator unit usable with a rotary flow-control valve.

BACKGROUND OF THE INVENTION

A standard flow-control a valve has a rotary spindle that must be turned through at most 360° between a full-on and a full-off position, and a stem surrounding the spindle. This stem is normally faceted, that is of polygonal shape and is centered on the rotation axis of the spindle. The spindle also is normally formed with teeth so that it can be fitted to a actuator for rotation of it and operation of the valve. For manual operation a handle with a seat complementary to the spindle is fitted to the spindle.

It is also known to provide such a standard rotary valve with a motorized actuator so that it can be operated remotely, and to provide in the actuator some form of sensor so that the position of the valve can be detected remotely. The typical motor actuator is a complex item that cannot readily be mounted on a standard flow-control valve. Even if some adapter can be used to mount the actuator to a normally manual valve, adjustment of it and of its angular position detector is a complex job.

OBJECTS OF THE INVENTION

It is therefore an object of the present invention to provide an improved motorized actuator for a flow-control valve.

Another object is the provision of such an improved motorized actuator for a flow-control valve which overcomes the above-given disadvantages, that is which can simply and easily be mounted on a standard rotary valve.

A further object is to provide such an actuator that requires no significant adjustment and that is relatively simple in construction.

SUMMARY OF THE INVENTION

The instant invention is a valve/actuator combination wherein the valve has a housing having a nonrotatable polygonal-section stem centered on a valve axis and a spindle coaxial with the stem, projecting axially therefrom, and formed with at least one peripheral tooth. The actuator has an electric drive motor having a housing and a drive shaft projecting from the housing along the axis and a sleeve fixed to the drive-motor housing coaxially with the shafts and formed with a seat complementarily engageable with the polygonal-section stem. Thus the sleeve an drive-motor housing are rotationally locked to the stem. A coupling fixed on the drive shaft fits complementarily over the spindle at the tooth thereof to rotationally interconnect the spindle and drive shaft and a rotary potentiometer in the sleeve between the coupling and the drive motor has a rotary part fixed on the drive shaft and a nonrotating part fixed on the motor housing.

Thus the entire actuator assembly can be a premanufactured unit that is fitted to the stem of the valve and secured thereto, for instance by means of a single set screw, to complete the installation. A valve is invariably provided with such a faceted stem which is held by a wrench as an installation nut is tightened, so that automatic coaxial positioning of the actuator on the valve is ensured. Such an arrangement can be mounted on a flow-control valve having a nearly full-revolution angular stroke, or on a simple shutoff valve normally only having a 90° stroke.

According to the invention the motor housing has a flange formed centrally with a hole through which the drive shaft projects and the sleeve is formed with an axial centering formation fitting in the hole. This flange is stepped and formed with a shoulder in the hole and the nonrotating potentiometer part is an annular disk fitting in the hole and pressed against the shoulder by the centering formation. The drive shaft is provided axially offset from the coupling with an abutment and the rotary potentiometer part is a wiper element fitted over the drive shaft, axially sandwiched between the coupling and the abutment, and extending through the disk. This is therefore and extremely simple and rugged assembly where the arguably delicate potentiometer parts are wholly internally mounted out of harm's way between the coupling and the flange.

The drive shaft according to the invention has at least one flat and the coupling is provided with retainer engaged thereagainst. Furthermore a cup-shaped adapter fits complementarily over the spindle and complementarily into the coupling. This adapter can be used to couple to nonstandard valve spindles but is wholly fitted between the coupling and valve spindle so it can be a very simple and cheap molded part with only one piece.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
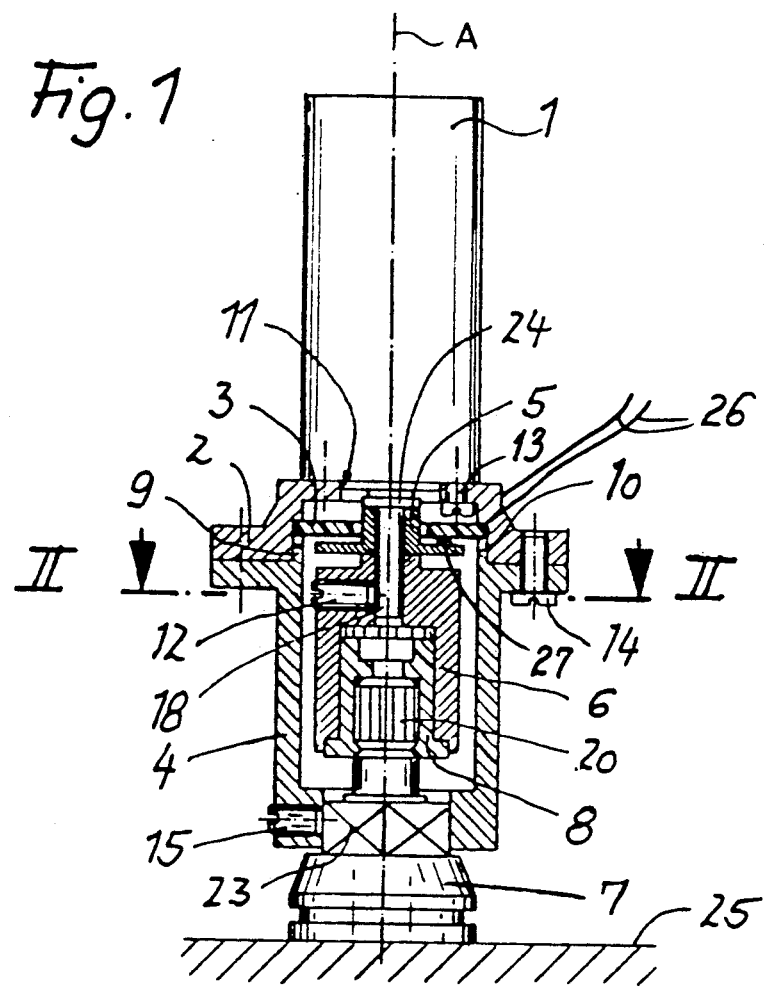
FIG. 1 is a vertical section through the valve/actuator assembly according to the invention.
Figure 2:
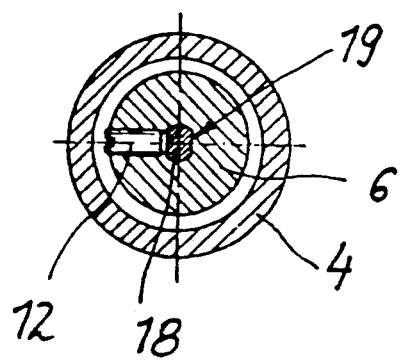
FIG. 2 is a section taken along line II—II of FIG. 1.

As seen in the drawing a drive-motor housing 1 centered on an axis A is secured by screws 13 to an annular flange 2 centered on the axis A and in turn secured by screws 14 to a mainly cylindrical sleeve 4 extending along the axis A. The motor in the housing 1 has an output shaft 18 also extending along the axis and formed as seen in FIG. 2 with flats 19.

Underneath the housing 1 is a valve stem 7 projecting from and fixed on a mounting surface 25 and formed with a faceted or hexagonal-section upper end 23 centered on the axis. A valve spindle 20 which is rotated through less than 360° between a full-on and a full-off position extends along the axis A from the stem 7. The unillustrated parts of the valve are of standard construction.

The drive shaft 18 projects through a hole 11 in the flange 2 and is formed with an abutment ring 24. A T-shaped wiper disk 5 fits on the shaft 18, mating with the flats 19 to be coupled thereto and carries a contact or wiper 27 riding on the disk 3. A coupling 6 has a central hole 22 that fits complementarily over the flatted shaft 18 and is secured thereto by a set screw 12. This coupling 16 forms a socket 16 that fits over a cup-shaped adapter 8 whose interior is complementary to the toothed outer end of the shaft 20 and whose exterior is complementary to the socket 16.

A resistance disk 3 fits on a shoulder 10 inside the flange 2 and the sleeve 4 has a centering rim 9 fitting complementarily into the flange 2 and pressing this disk 3 against the shoulder 10. An unillustrated radially inwardly projecting bump on the flange 2 fits in a complementary outwardly open notch on the disk 3 to rotationally lock the disk 3 in the flange 2 and leads 26 respectively connected to one end of an arcuate resistive strip on the disk 3 and to a wiper on the disk 5 lead out of the housing to a remote sensor.

Figure 3:
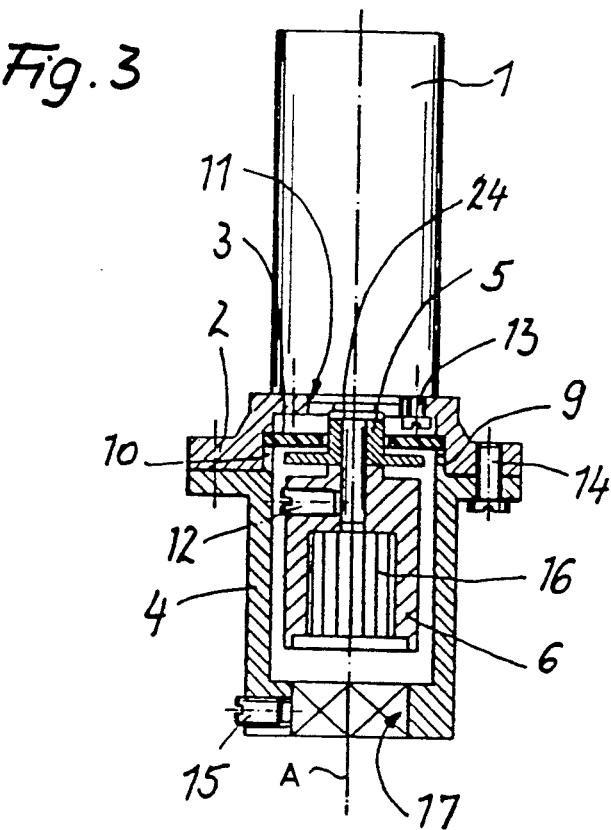
FIGS. 3 and 4 are axial sections respectively of the actuator and of the external parts of the valve.
Figure 4:
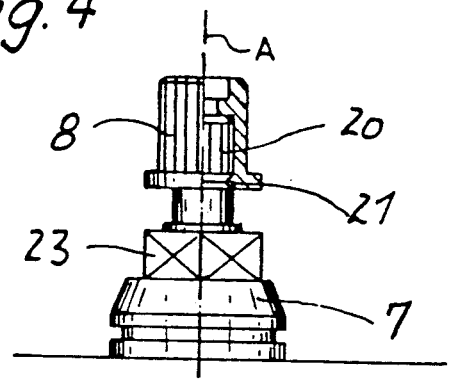
Figure 5:
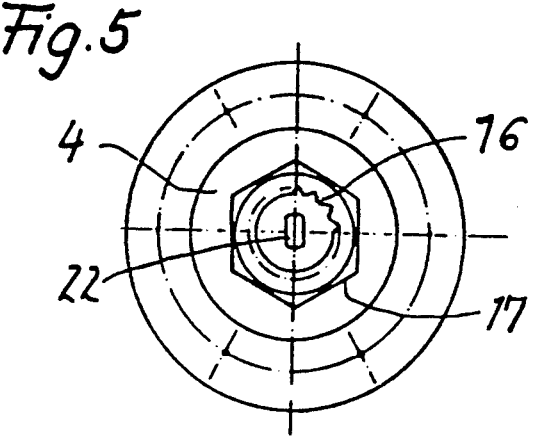
FIG. 5 is a bottom view of the actuator.

The sleeve 4 has a lower end formed centered on the axis A with a polygonal-section hole 17 that fits complementarily over the faceted upper end 23 of the stem 7. A set screw 15 extending radially through the lower end of the sleeve 4 can secure these two parts 17 and 23 together. It is therefore possible to fit the actuator as shown in FIG. 3 to the valve as shown in FIG. 4 and merely by tightening the single screw 15 to lock the assembly together.

Any angular position of the rotary parts of the assembly will correspond to a respective specific resistance of the potentiometer formed by the parts 3 and 5 so that it is possible remotely to determine the exact valve position.

I claim:

1. In combination with a flow-control valve having
   a housing having a nonrotatable polygonal-section stem centered on a valve axis; and
   a spindle coaxial with the stem, projecting axially therefrom, and formed with at least one peripheral tooth, an actuator comprising:
   an electric drive motor having a housing and a drive shaft projecting from the housing along the axis;
   a sleeve fixed to the drive-motor housing coaxially with the shafts and formed with a seat complementarily engageable with the polygonal-section stem, whereby the sleeve and drive-motor housing are rotationally locked to the stem;
   a coupling fixed on the drive shaft and fitting complementarily over the spindle at the tooth thereof to rotationally interconnect the spindle and drive shaft; and
   a rotary potentiometer in the sleeve having
   a rotary part fixed on the drive shaft and
   a nonrotating part fixed on the motor housing.

2. The actuator defined in claim 1 wherein the motor housing has a flange formed centrally with a hole through which the drive shaft projects, the sleeve being formed with an axial centering formation fitting in the hole.

3. The actuator defined in claim 2 wherein the flange is stepped and formed with a shoulder in the hole, the nonrotating potentiometer part being an annular disk fitting in the hole and being pressed against the shoulder by the centering formation.

4. The actuator defined in claim 3 wherein the drive shaft is provided axially offset from the coupling with an abutment and the rotary potentiometer part is a wiper element fitted over the drive shaft, axially sandwiched between the coupling and the abutment, and extending through the disk 5. The actuator defined in claim 1 wherein the drive shaft has at least one flat and the coupling is provided with retaining means engaged thereagainst.

6. The actuator defined in claim 1, further comprising
   a cup-shaped adapter fitting complementarily over the spindle and complementarily into the coupling.

7. The actuator defined in claim 1, further comprising clamping means engaged between the sleeve and the spindle.

8. A remotely operable valve comprising:
   a valve housing having a nonrotatable polygonal-section stem centered on a valve axis;
   a spindle coaxial with the stem, projecting axially therefrom, and formed with at least one peripheral tooth;
   an electric drive motor having a housing and a drive shaft projecting from the housing along the axis;
   a sleeve fixed to the drive-motor housing coaxially with the shafts and formed with a seat complementarily engageable with the polygonal-section stem, whereby the sleeve and drive-motor housing are rotationally locked to the stem;
   a coupling fixed on the drive shaft and fitting complementarily over the spindle at the tooth thereof to rotationally interconnect the spindle and drive shaft; and
   a rotary potentiometer in the sleeve between the coupling and the drive motor and having
   a rotary part fixed on the drive shaft and
   a nonrotating part fixed on the motor housing.

* * * * *